Figure 1:
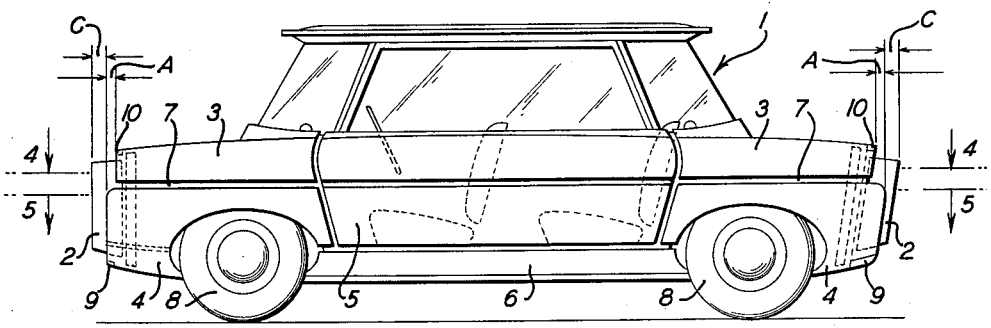

Oct. 30, 1962     B. BARÉNYI     3,061,361

MOTOR VEHICLE BODY CONSTRUCTION

Filed April 14, 1959     2 Sheets-Sheet 1

INVENTOR
BÉLA BARÉNYI

BY Dickey, Craig and Freudenberg
ATTORNEYS

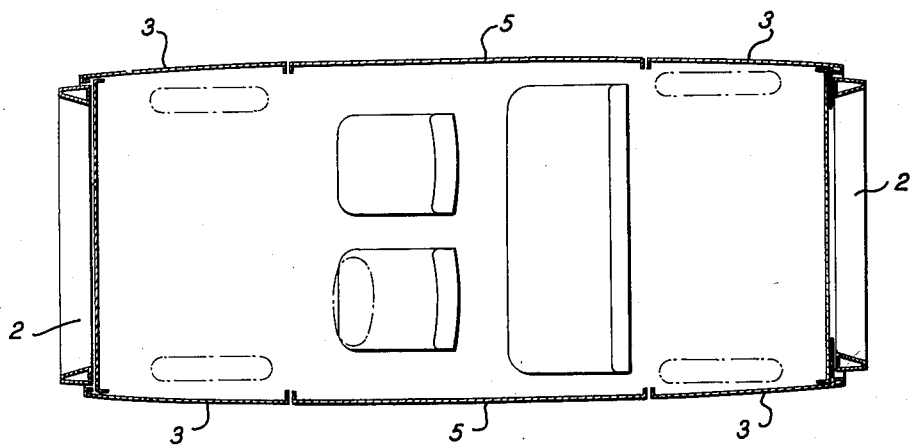
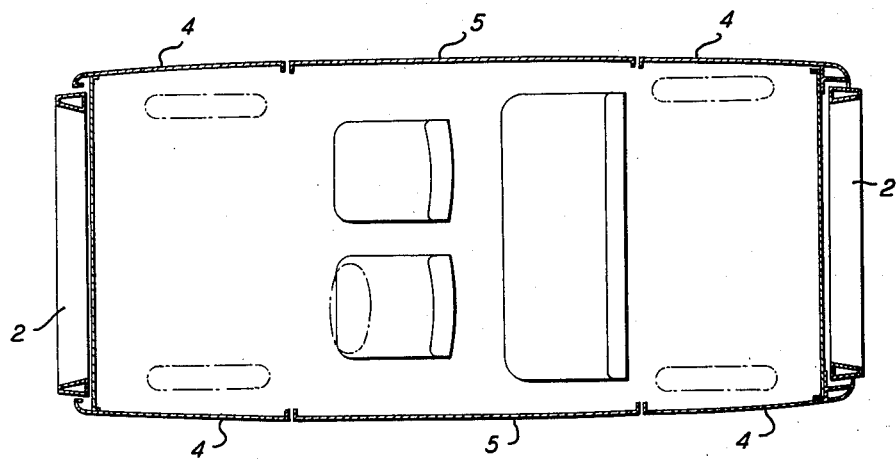

United States Patent Office 3,061,361
Patented Oct. 30, 1962

3,061,361
MOTOR VEHICLE BODY CONSTRUCTION
Béla Barényi, Stuttgart-Vaihingen, Germany, assignor to Daimler-Benz Aktiengesellschaft, Stuttgart-Unterturkheim, Germany
Filed Apr. 14, 1959, Ser. No. 806,309
Claims priority, application Germany Apr. 17, 1958
7 Claims. (Cl. 296—28)

The present invention relates to a motor vehicle with a pontoon-shaped vehicle structure the vehicle body of which consists of a body end or head piece arranged at least at one end of the vehicle, of a body hood-shaped upper part and of a body lower part arranged outside the wheel tread whereby the upper part is movable with respect to the lower part, particularly in a pivotal manner, and wherein the vehicle is subdivided into a vehicle upper and lower part by a substantially horizontal separating gap.

In one prior art construction of this type, the separating joint between the vehicle body upper part and the vehicle body lower part extends all the way up to the end of the vehicle end parts. In contrast thereto, the present invention relates to a vehicle in which the separating gap between the vehicle upper and lower parts terminates short of the vehicle end and essentially consists in that the ends of the horizontally separated parts of the vehicle body are separated at least at one end thereof by a transverse gap and are combined thereat into a troughlike vehicle body end piece which connects the vehicle upper and lower part of the body construction at the front and/or at the rear end of the vehicle body. The transverse separating gap may thereby be either rectilinear, angularly bent or curved.

Such a construction in accordance with the present invention offers the advantage that the curved ends of the vehicle body are combined into a unitary structural part and that the configuration and shape of the other parts of the vehicle body are thereby considerably simplified and the cost of manufacture thereof is considerably reduced. Consequently, a construction of the vehicle body in accordance with the present invention provides an advantageous subdivision of the vehicle body into as few parts as possible which may be manufactured in as simple as possible a manner and which may be readily repaired or exchanged after any slight collisions. The present invention thereby is based on the practical experience which teaches that in case of such small collisions the vehicle body end piece and the lower part are likely to be damaged primarily.

A further simplification in the configuration and construction of the individual parts of the vehicle body in accordance with the present invention may be advantageously achieved in that the upper and/or the lower part of the vehicle body disposed between the vehicle end pieces may be subdivided into additional sub-parts by further transverse separating planes.

The present invention is particularly concerned with the problem in connection with vehicles of the type described hereinabove the hood-shaped upper part of which is disposed at one vehicle end part so as to be movable with respect to the lower part thereof, especially so as to be pivotal with respect thereto, to construct the vehicle body in such a manner that the installations and devices for moving and closing the hood-shaped upper part are afforded an additional protection against damages in case of the aforementioned slight collisions.

This task and problem is solved in accordance with the present invention in that the lower part of the vehicle body projects at the place of the separating joint formed between itself and the upper body part, with respect to the vehicle upper body part in the longitudinal and/or the transverse direction.

Such a construction in accordance with the present invention offers the advantage that the hood-shaped upper part of the vehicle body is slightly set back with respect to the lower part thereof and that the installations and devices necessary for the movement and support thereof, such as, for example, the guide members, the hinges or the locks are disposed within the effective protective area of the projecting edge of the vehicle lower part.

According to the present invention the vehicle body of the motor vehicle may be advantageously so constructed that the projecting edge of the lower part is reinforced. Possibly the free end of the lower part of the vehicle body may surround the vehicle body head or end piece with a bulge-like rim. The rim may thereby find its continuation in the free end of the upper vehicle part so that both body parts of the vehicle body surround the vehicle body end piece in an annularly manner and, more particularly, with a gap or spacing and that the vehicle body end piece extends in the longitudinal direction with respect to both of these vehicle body parts.

Accordingly, it is an object of the present invention to provide a vehicle body construction for motor vehicles which permits a simple and effective subdivision of the vehicle body.

Another object of the present invention is the arrangement and construction of the vehicle body part of a motor vehicle which permits ready repair or exchange of those parts damaged in case of minor collision.

Still another object of the present invention resides in the provision of a vehicle body construction and arrangement of the various body parts in such a manner as to protect in particular those body parts exposed to damage in case of minor collisions.

A further object of the present invention is to provide an arrangement and construction of a vehicle body for motor vehicles provided with a hood-shaped vehicle upper part pivotal with respect to a vehicle lower part whereby the parts necessary to provide appropriate guidance and pivotal movement of the upper part are additionally protected by the particular construction and configuration of the vehicle lower part.

Figure 2:
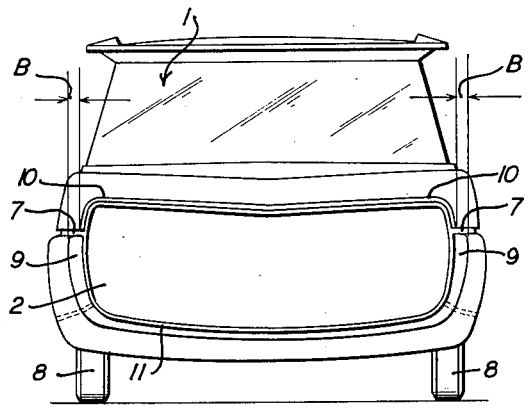
Figure 3:
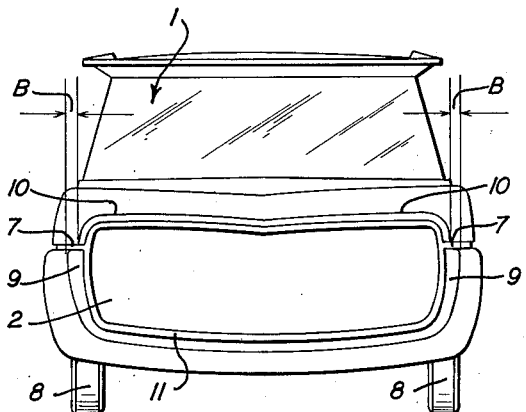

These and other objects, features and advantages of the present invention will become more obvious from the following description when taken in connection with the accompanying drawing which shows, for purposes of illustration only, one embodiment in accordance with the present invention, and wherein:

FIGURE 1 is an elevational side view of a motor vehicle body construction in accordance with the present invention, FIGURE 2 is a front view of the vehicle body construction in accordance with the present invention of the vehicle illustrated in FIGURE 1, FIGURE 3 is an end view of the rear of the vehicle body construction in accordance with the present invention of the motor vehicle illustrated in FIGURE 1, FIGURE 4 is a somewhat schematic longitudinal cross sectional view taken along line 4—4 of FIGURE 1, and FIGURE 5 is a somewhat schematic longitudinal cross sectional view taken along line 5—5 of FIGURE 1.

Referring now to the drawing wherein like reference numerals are used throughout the various views to designate like parts, reference numeral 1 generally designates the vehicle top of a pontoon-shaped vehicle body of a motor vehicle which top may be constructed in any suitable manner. The pontoon-shaped vehicle body essentially consists at each vehicle end thereof of a unitary vehicle body end piece 2, of hood-shaped vehicle body upper part 3 and of a vehicle body lower part 4 disposed outside the wheel tread and possibly itself consisting of several parts. A door 5, for example, constructed as a slidable door, is disposed on each side between end parts of the vehicle. A longitudinal bearer member 6 of any suitable construction is disposed within the region of each door 5 on each side of the vehicle.

A U-shaped separating joint or gap 7 which extends essentially horizontally at the height of the upper tire edge of the vehicle wheels 8 is disposed between the body upper part 3 and the body lower part 4 and separates the same. The upper part 3 may thereby be suitably pivoted in any conventional manner at the superstructure or frame of the motor vehicle, for example, at the end thereof adjacent the door 5 so as to be pivotal in the direction toward the top 1 of the vehicle, and may be provided at the free end thereof with a lock of suitable construction.

The vehicle body lower parts 4 are so constructed that they are somewhat wider and longer than the vehicle upper parts 3 and project therebeyond in the longitudinal as well in the transverse direction beyond the vehicle upper parts 3. The projecting portion in the longitudinal direction is designated in FIGURE 1 with A and in the transverse direction in FIGURE 2 with B. The edge of the lower part 4 is shaped at the separating joint 7 as well as at the free end of the lower part 4 into a bulge-like rim portion 9 the width of which, as may be clearly visible from FIGURE 2 and FIGURE 3, may possibly decrease in a direction toward the vehicle center. The bulge-like rim portion 9 which already by reason of its particular configuration and shape possesses relatively high rigidity may possibly also be reinforced in any suitable conventional manner. A similar bulge-like rim portion 10 may also be provided in a similar manner at the free end of the upper part 3.

The bulge-like rim portions 10 and 9 arranged at the free ends of the vehicle body parts 3 and 4 respectively surround an aperture in which the vehicle body end piece 2 is arranged at each vehicle end. The vehicle end piece 2 is delimited, for example, by a frame which is so dimensioned and arranged at the superstructure or frame of the motor vehicle that a small annularly-shaped air gap 11 remains between the frame and the vehicle body parts 3 and 4. Whereas the lower parts 4 project beyond the upper parts 3 in the longitudinal direction by an amount A, the vehicle body end pieces 2, in their turn protrude beyond the vehicle lower parts 4 by an amount designated in FIGURE 1 by C. The terminal edge portions of the body parts 2, 3 and 4 may thereby be arranged in a vertical manner as shown at the front end of the vehicle in connection with FIGURE 1 or in an inclined manner, as shown in connection with the rear end thereof.

The separating joint between the vehicle end piece, on the one hand, and the vehicle upper and lower parts 3 and 4, on the other, may thereby extend rectilinearly either vertically or at an incline as shown at the front and rear end of the vehicle or may be such as to form an angle therebetween or may be curved in any suitable manner.

The vehicle body may also be constructed in such a manner that the vehicle body lower parts 4 and the analogous portions of the door 5 are constructed integrally with each other or merely are provided with a separating joint essentially in the center of the vehicle whereas the upper parts 3 and the remaining part of the top are separated therefrom by an essentially horizontally extending separating joint.

While I have shown and described one embodiment in accordance with the present invention it is understood that the same is not limited thereto but is susceptible of many changes and modifications within the spirit and scope of the present invention, and I, therefore, do not wish to be limited to the details shown and described herein but intend to cover all such changes and modifications are are encompassed by the scope of the appended claims.

What is claimed is:

1. A motor vehicle having a pontoon-shaped vehicle body comprising, at least at one end thereof, a hood-shaped upper body part, a lower body part disposed essentially below said upper body part and having lateral portions outside the wheel tread of the vehicle, a body end part terminating both said upper body part and said lower body part in the longitudinal direction thereof, said upper body part being movable relative to said lower body part to afford access to a region beneath said upper body part, said lower body part projecting beyond said upper body part both in the longitudinal direction of the vehicle and in the transverse direction of the vehicle at both sides, said upper body part and said lower body part being separated by an essentially horizontally extending separating gap of U-shaped configuration as seen in plan view, said body end part projecting within both said upper body part and said lower body part and enclosing the major portion of that part of the U-shaped separating gap that extends transversely to the longitudinal direction of the vehicle, whereby said lower body part protects said upper body part from collision and said body end part protects both said upper body part and said lower body part from collision.

2. A motor vehicle having a pontoon-shaped vehicle body according to claim 1, wherein said hood-shaped upper body part is normally pivotal with respect to said lower body part.

3. A motor vehicle having a pontoon-shaped vehicle body according to claim 1, wherein the free end of said lower body part is provided with a bulge-like rim portion partially surrounding said body end part.

4. A motor vehicle having a pontoon-shaped vehicle body according to claim 1, wherein the free ends of said upper and lower body parts surround said body end part with an annular gap therebetween, and wherein said body end part extends in the longitudinal direction of the vehicle beyond said upper and lower body parts.

5. A motor vehicle having a pontoon-shaped vehicle body according to claim 4, wherein said body end part is made of unitary structure.

6. A motor vehicle having a pontoon-shaped vehicle body according to claim 1, wherein said hood-shaped upper body part extends substantially over the entire width of the vehicle superstructure.

7. A motor vehicle having a pontoon-shaped vehicle body according to claim 1, wherein at least part of the upper surface of the lower body part projecting beyond the upper body part extends substantially horizontally.

References Cited in the file of this patent

UNITED STATES PATENTS

| 963,854 | Bieber | July 12, 1910 |
| 1,712,562 | Jeffers | May 14, 1929 |
| 2,459,502 | Craig | Jan. 18, 1949 |
| 2,953,409 | Barényi | Sept. 20, 1960 |

FOREIGN PATENTS

| 694,056 | Great Britain | July 15, 1953 |
| 712,956 | Great Britain | Aug. 4, 1954 |
| 765,152 | Great Britain | Jan. 2, 1957 |
| 1,005,858 | Germany | Apr. 4, 1957 |